United States Patent [19]

Aubry et al.

[11] Patent Number: 6,022,614
[45] Date of Patent: Feb. 8, 2000

[54] METHOD FOR PREPARING A CELLULOSE FORMATE SOLUTION BY IMPREGNATING AND KNEADING CELLULOSE SLABS

[75] Inventors: Jean-Claude Aubry, Dubendorf, Switzerland; Bernardus Maria Koenders, WG Westervoort, Netherlands; James Cartwright Williams, Memphis, Tenn.

[73] Assignee: Michelin Recherche et Technique S.A., Cedex, France

[21] Appl. No.: 08/981,594

[22] PCT Filed: Jun. 28, 1996

[86] PCT No.: PCT/EP96/02827

§ 371 Date: Mar. 17, 1998

§ 102(e) Date: Mar. 17, 1998

[87] PCT Pub. No.: WO97/02292

PCT Pub. Date: Jan. 23, 1997

[30] Foreign Application Priority Data

Jul. 3, 1995 [FR] France .................................. 95 08005

[51] Int. Cl.⁷ ...................................................... D04H 1/04
[52] U.S. Cl. ..................................... 428/295.1; 428/292.4; 428/297.4; 428/532; 536/67; 106/170.15; 106/170.27
[58] Field of Search .............................. 428/292.4, 295.1, 428/297.4, 532; 536/67; 106/170.15, 170.27

[56] References Cited

U.S. PATENT DOCUMENTS

| 4,839,113 | 6/1989 | Villaine et al. . |
| 5,593,487 | 1/1997 | Meraldi et al. ....................... 106/170.1 |
| 5,880,278 | 3/1999 | Huston et al. ............................ 536/67 |

FOREIGN PATENT DOCUMENTS

| 9116357 | 10/1991 | WIPO . |
| 9417136 | 8/1994 | WIPO . |

*Primary Examiner*—Helen L. Pezzuto
*Attorney, Agent, or Firm*—Baker & Botts LLP

[57] ABSTRACT

Process for preparing a solution of cellulose formate from cellulose plates, in particular high-density plates, without prior mechanical destruction of these plates. The plates are dissolved directly, by means of an impregnating step of the whole plates in a base liquid of formic acid, followed by an operation of kneading of the plates thus impregnated in contact with both formic acid and phosphoric acid. The process is preferably carried out in order to prepare ready-for-spinning solutions with, in particular, if necessary, an intermediate operation of adjustment of the final composition. Solutions prepared using such a process. Preparation of objects made of cellulose, starting with these solutions, in particular fibers or films. Assemblies of such fibers or films. Articles reinforced with such fibers or films or assemblies, these reinforced articles being especially tires.

30 Claims, 1 Drawing Sheet

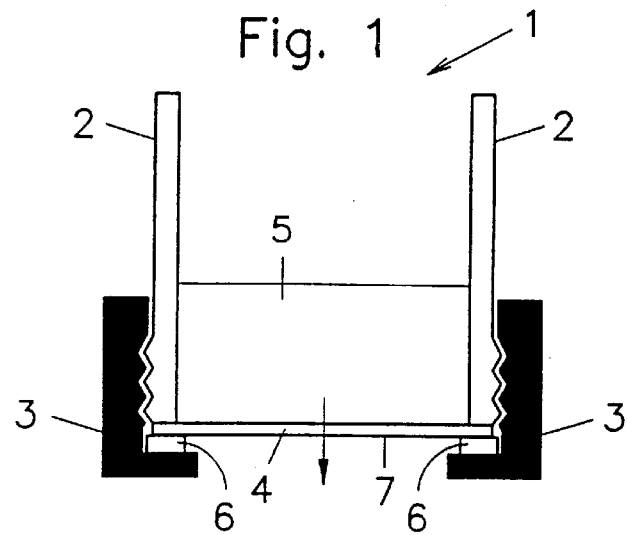
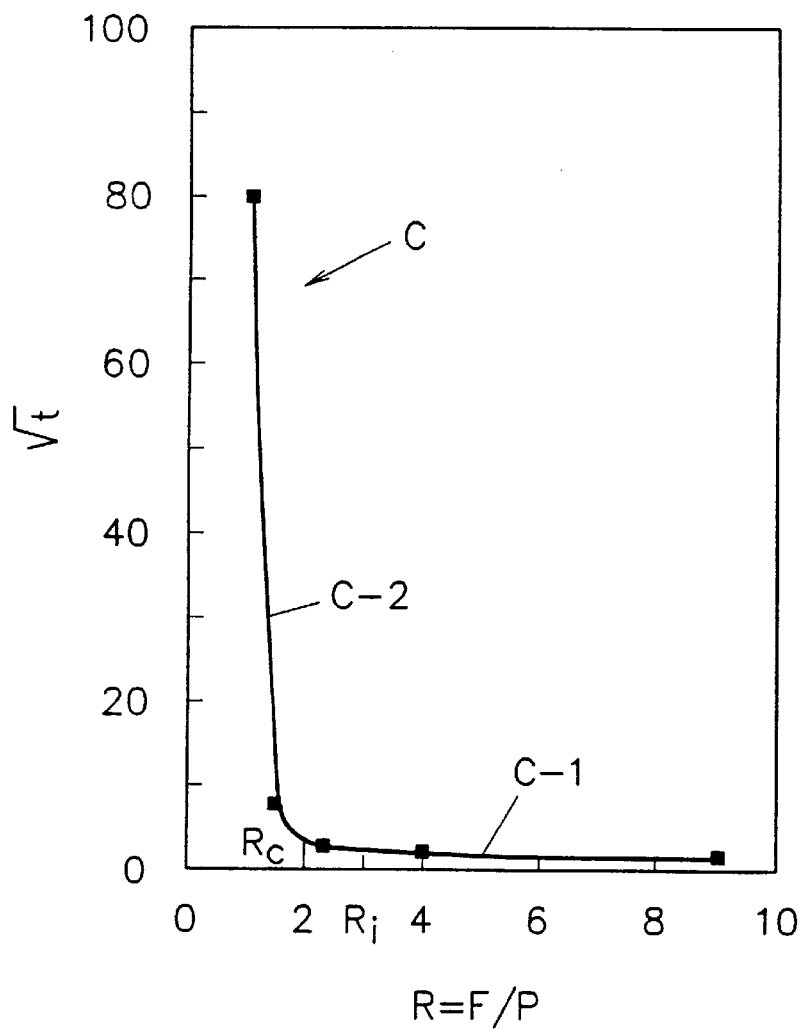

METHOD FOR PREPARING A CELLULOSE
FORMATE SOLUTION BY IMPREGNATING
AND KNEADING CELLULOSE SLABS

BACKGROUND OF THE INVENTION

The invention relates to cellulose derivatives.

The term "cellulose derivatives" is understood here to refer to the compounds formed, after chemical reactions, by substitution of the hydroxyl groups of cellulose, these derivatives also being referred to as substitution derivatives. The invention relates in particular to cellulose formates and to solutions of cellulose formates.

Processes for obtaining cellulose derivatives and/or solutions of these derivatives, as well as certain specific steps of these processes, have been described in a large number of documents. Reference will be made, in particular, to patent EP-B-179,822. That document describes the production of anisotropic spinning compositions based on cellulose formate, by reaction of cellulose with formic acid and phosphoric acid, as well as of the fibers with high-quality mechanical properties obtained from these compositions, it being possible for these fibers to be regenerated.

More specifically, the invention relates to processes for manufacturing cellulose formates and solutions thereof, in particular solutions which can be spun, when these processes are carried out using a cellulose pulp industrially conditioned in the form of plates.

These plates are, in a known manner, rigid sheets whose thickness is generally between 0.2 mm and 5.0 mm, usually about 0.5 to 2 mm, in which the cellulose is in fibrous, relatively compacted form depending on the desired density for these plates. These plates are generally in a flat, rectangular, cut form or in a form rolled up on themselves in order to form continuous (narrow) strips.

A distinction is usually made, by convention, between so-called "low-density" plates, whose density is less than 0.5 g/cm$^3$, and so-called "high-density" plates, whose density is at least equal to 0.5 g/cm$^3$.

In the industry of cellulose transformation, and in particular in the industry of cellulose fibers and films, these are plates which are easy to transport and store, and are used essentially as base materials. Such plates or their use as starting material have been described, for example, in the following patents or patent applications: EP-A-251,674, FR-A-2,678,625, U.S. Pat. Nos. 2,105,498, 2,393,783, 2,644,818, 4,211,574, 4,336,370, 4,343,840, 4,840,673, 5,036,900, 5,114,535.

When such cellulose plates are used as starting material, all the known methods for obtaining cellulose derivatives and/or solutions thereof, as varied as they are, require the same prior step of mechanical destruction of these plates, this operation being intended to make them lose their unity and cohesion, by separating the fibers constituting them in order thereby to make the cellulose accessible to the various reactants used.

The term mechanical destruction is understood to refer very generally here to any operation of disintegration in general, whether it is total disintegration, that is to say reduction to powder obtained by a pulverization technique, or partial disintegration obtained by shredding, partial grinding, attrition or any equivalent action, such disintegration operations being carried out using known suitable tools or machines such as, for example, mincers, milling machines, grinders or shredders.

The reduction of cellulose plates to powder is a common operation. It is generally carried out independently of any other process, it being possible for the powder thus obtained to be stored before being processed. The powder moreover has the advantage of good chemical reactivity and of being commercially available. The use of powder is thus totally widespread, in particular for laboratory-scale tests which require only limited amounts of material.

Besides the pulverization costs themselves, this reduction to powder has many other drawbacks. One major drawback lies in the safety problems associated with the explosion or fire risks. These risks, which are inherent in operations for pulverization, handling or storage of powders in an uncontrolled atmosphere, have been mentioned, for example, in U.S. Pat. No. 5,036,900. They require the use of expensive safety and control devices. Other known drawbacks are associated with the loss of material in the form of dusts, with the very presence of these dusts and with the transportation and storage problems posed in the face of a considerable increase in the volume of the starting material after it has been pulverized. All of these constraints are difficult to accommodate, in economic terms, for large-scale industrial manufacture.

The partial disintegration methods, as mentioned above, have, for the various reasons outlined above, been favored in a large number of processes. Only a few examples will be mentioned.

Document FR-A-2,678,625 describes a process for the production of cellulose acetate, in which a high-density cellulose plate is disintegrated using various grinders. U.S. Pat. No. 2,393,783 describes the destruction of plates and the dispersion of the individual fibers by subjecting these plates to a violent blow of compressed air, before esterification. U.S. Pat. No. 2,644,818 describes a process for producing cellulose ethers with a specific step of shredding alkalicellulose plates. U.S. Pat. No. 5,036,900 describes a machine designed to shred high-density cellulose plates, before a step of acetylation.

The industrial processes most widely known and developed such as, for example, those known as the acetate process or the xanthate or viscose process, from the name of the cellulose derivatives obtained or from the name of their solutions, also make use of these techniques of partial disintegration of plates. This disintegration is thus a fully integral, entirely separate step of these processes.

However, all of these partial disintegration methods themselves have a certain number of drawbacks. Besides the actual machine costs, a major drawback lies in the risk of deactivation (loss of chemical reactivity) of the cellulose during disintegration. In order to avoid or limit this deactivation, it will be necessary, for example, to disintegrate the plates using specific, and restricting, conditions of drying and wetting the material. In certain cases, a reactivation treatment of the cellulose may even be necessary. Other drawbacks lie in the risks of degradation of the cellulose (such as depolymerization, for example), and losses of material in the form of dusts. Needless to say, all of these drawbacks have a negative impact on the final industrial cost. Some of them have been mentioned in particular in the following documents: FR-A-2,678,625, U.S. Pat. Nos. 2,105,498, 2,393,783, 5,036,900, 5,114,535.

SUMMARY OF THE INVENTION

The aim of the present invention is to propose a process for obtaining solutions of cellulose formates, and for obtaining these cellulose formates themselves, starting directly from cellulose plates.

This process requires no prior action of mechanical disintegration of these plates, it is fast, easy to carry out and free of all the abovementioned drawbacks. It allows solutions to be obtained, and in particular spinning solutions, by simple impregnating of the plates followed by kneading of these impregnated plates.

The process in accordance with the invention, for directly preparing a solution of cellulose formate by reaction of cellulose with formic acid and phosphoric acid, is characterized by the following points:

a) cellulose plates are used;
b) the said plates are first fully impregnated with an impregnating liquid based on formic acid;
c) after this preliminary impregnating, the plates are kneaded in contact with both formic acid and phosphoric acid.

The invention also relates to the following products:

the solutions obtained from such a process, and in particular the spinning solutions, that is to say the solutions which can be spun in order to obtain fibers or films;

the cellulose formates themselves, when they are obtained from such solutions;

objects made of cellulose formate or of regenerated cellulose obtained from the solutions in accordance with the invention, these objects being, in particular fibers, films or profiles;

the reinforcing assemblies each including at least one fiber and/or film in accordance with the invention, for example cables, cords and multi-filament fibers twisted on themselves, it being possible for such reinforcing assemblies to be, for example, hybrids or composites, that is to say assemblies including elements of different nature, possibly not in accordance with the invention;

articles reinforced with the objects in accordance with the invention, in particular articles each reinforced with at least one fiber and/or film and/or assembly in accordance with the invention, these articles being, for example, rubber or plastic articles, for example tires, tubing, belts and plies.

The invention will readily be understood with the aid of the description and the non-limiting examples which follow, as well as the fully schematized figures relating to these examples.

DESCRIPTION OF THE DRAWING

In the drawing:

FIG. 1 represents a device which makes it possible to carry out a test of impregnating of cellulose plates by an impregnating liquid based on formic acid, it being possible for this test to assist in the choice of certain conditions for carrying out the process of the invention;

FIG. 2 represents the variation of the square root of the impregnating time as a function of the weight ratio R=F/P (formic acid/phosphoric acid), for various impregnating liquid compositions, in the case of a sample of high-density cellulose plate subjected to the impregnating test.

DESCRIPTION OF PREFERRED EMBODIMENTS

I. MEASUREMENTS AND TESTS USED

I-1. Degree of Polymerization

The degree of polymerization is abbreviated as DP. The DP of cellulose is measured in a known manner, this cellulose being in powder form or converted beforehand into powder.

The inherent viscosity (IV) of the dissolved cellulose is first determined according to Swiss Standard SNV 195 598 of 1970, but at different concentrations which range between 0.5 and 0.05 g/dl. The inherent viscosity is defined by the equation:

$$IV = (1/C) \times Ln\ (t_1/t_0)$$

in which C represents the concentration of dry cellulose, $t_1$ represents the duration of flow of the dilute polymer solution, $t_0$ represents the duration of flow of the pure solvent, in a Ubbelhode-type [sic] viscometer, and Ln represents the Naperian logarithm. The measurements are taken at 20° C.

The intrinsic viscosity $[\eta]$ is then determined by extrapolation of the inherent viscosity IV to zero concentration.

The weight-average molecular mass $M_W$ is given by the Mark-Houwink relationship:

$$[\eta] = K \times M_W^\alpha$$

where the constants K and $\alpha$ are, respectively:

$K=5.31\times10^{-4}$; $\alpha=0.78$, these constants corresponding to the solvent system used to determine the inherent viscosity. These values are given by L. Valtasaari in the document Tappi 48, 627 (1965).

The DP is finally calculated according to the formula:

$$DP = (M_W)/162,$$

162 being the molecular mass of the elementary cellulose unit.

When it is a matter of determining the DP of cellulose from cellulose formate in solution, this formate must first be isolated, and the cellulose then regenerated. The process thereafter proceeds as follows.

The solution is first coagulated with water in a dispersing machine. After filtration and washing with acetone, a powder is obtained which is then dried in an oven under vacuum at 40° C. for at least 30 minutes. After the formate has been isolated, the cellulose is regenerated by treating this formate at reflux with normal sodium hydroxide. The cellulose obtained is washed with water and dried and the DP is measured as described above.

I-2. Degree of Substitution

The degree of substitution of cellulose as cellulose formate, also referred to as the degree of formylation, is abbreviated as DS.

The DS determined by the method described here gives the percentage of alcohol functions in the cellulose which are esterified, that is to say converted into formate groups. This means that a DS of 100% is obtained if the three alcohol functions in the cellulose unit are all esterified, or that a DS of 30%, for example, is obtained if 0.9 alcohol function out of three, on average, is esterified.

The DS is measured differently depending on whether the characterization is being made on cellulose formate in solution or cellulose fibers regenerated after spinning such a solution.

I-2.1. DS in Solution

The cellulose formate is first isolated from the solution as indicated above in paragraph I.1.

200 mg of cellulose formate thus isolated are weighed out accurately and are introduced into a conical flask. 40 ml of water and 2 ml of normal sodium hydroxide (1N NaOH) are added. The mixture is heated to 90° C. at reflux for 15 minutes under nitrogen. The cellulose is thus regenerated, reconverting the formate groups into hydroxyl groups. After cooling, the excess sodium hydroxide is back-titrated with decinormal hydrochloric acid solution (0.1N HCl) and the DS is deduced therefrom.

I-2.2. DS on Regenerated Cellulose Fibers

About 400 mg of fibers are cut into pieces 2 to 3 cm long and introduced into a 100 ml conical flask containing 50 ml of water. 1 ml of normal sodium hydroxide (1N NaOH) is added. The mixture is stirred at room temperature for 15 minutes. The cellulose is thus regenerated completely by converting into hydroxyl groups the final formate groups which had withstood the regeneration carried out, after spinning them, directly on continuous fibers. The excess sodium hydroxide is titrated with decinormal hydrochloric acid solution (0.1N HCl) and the DS is thus deduced therefrom.

I-3. Optical Properties of the Solutions

The isotropy or anisotropy of the solutions is determined by placing a drop of test solution between the linear crossed polarizer and analyzer of an optical polarization microscope, followed by observing it at rest, that is to say in the absence of a dynamic constraint, at room temperature. In a known manner, an anisotropic solution depolarizes light, whereas the field of the microscope remains black in the case of an isotropic solution.

I-4. Mechanical Properties of the Fibers

Th term "fibers" is understood here to refer to multifilament fibers consisting, in a known manner, of a large number of elementary filaments of low diameter (low linear density). All the mechanical properties below are measured on fibers which have undergone preconditioning. The term "preconditioning" is understood to refer to the storage of the fibers, before measurement, under a standard atmosphere (temperature of 20±2° C.; hygrometry of 65±2%) for at least 24 hours.

The linear density of the fibers is determined on at least three samples, each corresponding to a length of 50 m, by weighing this length of fiber. The linear density is given in tex (weight in grams of 1000 m of fiber).

The mechanical properties of the fibers (tenacity, initial modulus and elongation at break) are measured, in a known manner, using a Zwick GmbH & Co (Germany) 1435-type or 1445-type tension machine. After receiving a low prior protective torsion (helical angle of about 60°), the fibers undergo tension over an initial length of 400 mm, at a speed of 50 mm/min. All the results given are an average of 10 measurements.

The tenacity and the initial modulus are indicated in cN per tex (centinewtons per tex). The elongation at break is indicated as a percentage. The initial modulus is defined as the slope of the linear part of the force-elongation curve, which occurs just after the standard 0.5 cN/tex pretension.

I-5. Impregnating Test of Cellulose Plates

The present test, carried out on a cellulose plate sample, can be used in particular, prior to carrying out the process of the invention, as an aid in selecting the composition of the impregnating liquid based on formic acid. FIG. 1 represents, as a sectional drawing, an example of a device which allows this impregnating test to be carried out.

This device 1 consists essentially of a cylindrical-shaped tube 2, a movable support foot 3 holding the tube 2 in a vertical position, and a disk 4 precut into the cellulose plate to be studied and thus constituting the test sample. As clearly illustrated in FIG. 1, this disk 4, serving as a base to the tube 2, constitutes, in this position, the bottom of a cylindrical chamber into which the impregnating liquid 5 will be poured, an O-ring joint 6 supporting, for example, the disk 4 and ensuring leaktightness.

By way of example, tube 2 (made of glass) and joint 6 (made of silicone) have an outside diameter of 39 mm, the cellulose disk 4 has a diameter of 38 mm and the total height of the device is about 150 mm. Needless to say, the cellulose sample could consist of several disks placed one on top of the other. As a general rule, the test sample has the same thickness as the plate from which it is cut out.

Once the test sample has been placed in the device 1, the impregnating liquid 5 (about 50 ml) is poured in very rapidly, and a chronometer is started. The sample is thus left to become impregnated, by simple contact, and the average impregnating time (written as "t") of the disk 4, that is to say the time required to impregnate the cellulose disk 4 fully, until its inner face 7 is itself totally soaked with the liquid, is measured (at least 3 measurements). A simple visual assessment proves to be sufficiently accurate: a standard deviation of less than 10% of the time "t" (coefficient of variation of less than 10%) is obtained, for example, for impregnating times of longer than 10 seconds. A mirror placed on the device 1 (not represented in FIG. 1) facilitates the observation and measurement.

The impregnating test makes it possible to study the effect of different experimental parameters on the ability of the impregnating liquid to impregnate a given plate, in particular as regards the penetration kinetics of the liquid, it being possible for these experimental parameters to be, for example, the thickness or density of the plates, the composition of the liquid or even its temperature.

An impregnating test can especially be carried out beforehand, when it is desired to use, in the process of the invention, an impregnating liquid containing phosphoric acid. As explained hereinbelow, a critical weight ratio (formic acid/phosphoric acid), abbreviated as $R_c$, can be determined by means of the test, below which ratio the impregnating of the cellulose plate is disrupted, or even blocked, on account of an excessively high phosphoric acid content in the impregnating liquid. The determination of the ratio $R_c$ then makes it possible to define, for the impregnating liquid, a preferred (formic acid/phosphoric acid) weight ratio range.

Preferably, the cellulose disks are conditioned before the test, so as to work under constant initial temperature and humidity conditions.

It goes without saying that the impregnating times measured in this test are intrinsic to the specific conditions of the test, as described above, the test not being intended to reproduce or simulate the actual and particular conditions for carrying out the invention.

II. CONDITIONS FOR CARRYING OUT THE INVENTION

II-1. Preliminary Comments

The process in accordance with the invention applies to any type of cellulose formate solution. The term "solution" is understood here to refer to, in a known manner, a homogeneous liquid composition in which no solid particles are visible to the naked eye.

The solutions in accordance with the invention can, for example, be spinnable (ready-for-spinning) or can be non-spinnable, have a weak or strong cellulose concentration and be optically isotropic or anisotropic. Thus, the process can be carried out according to specific conditions which can vary considerably depending on the solutions prepared and the applications envisaged.

As explained in the description hereinbelow, the implementation of the invention requires, on account of the use of cellulose plates, initial proportions of cellulose, of formic acid and of phosphoric acid which are not, in most cases, the proportions intended for the final solution. This is especially true for the production of ready-for-spinning solutions, that is to say solutions which can be transferred directly to a spinning machine in order thereat to be spun immediately. In such a case, an appreciable excess of formic acid can in fact be used during the impregnating step.

It is consequently necessary to remove this excess formic acid, that is to say to adjust the composition of the solution, before the end of the process. The process of the invention is, in this case, carried out so as to verify, at the end of the process, the following two relationships in the final solution:

$$K_o = C_o/(C_o + F_o + P_o + X_o); \text{tm} \quad (1)$$

$$R_o = (F_o/P_o) \quad (2)$$

with:
- $C_o$: parts by weight of cellulose, based on a non-esterified cellulose;
- $F_o$: total parts by weight of formic acid, this formic acid being either in the form of formate or in the form of free formic acid;
- $P_o$: parts by weight of phosphoric acid;
- $X_o$: parts by weight of other optional constituents;
- $K_o$: predefined adjustment value for the cellulose concentration;
- $R_o$: predefined adjustment value for the weight ratio of the formic and phosphoric acids.

All the values in relationships (1) and (2) above thus relate only to the final solution, as obtained at the end of the process. For simplification, the following conventions are applied:
- the parts by weight indicated above are crude, uncorrected values of the initial water content of the various constituents;
- since the degree of substitution of the cellulose is not known a priori, only the weight corresponding to a non-esterified cellulose is taken into account for the definition of the values $K_o$ and $C_o$, whether or not there is esterification of the alcohol functions, the portion of water formed during this esterification, itself not being known a priori, is thus not taken into account either;
- for the same reason as above, the term total formic acid is understood to refer to the portion of formic acid consumed for the esterification, plus the portion of free formic acid remaining in the final solution;
- the terms "formic acid" and "phosphoric acid" are to be considered here in a general sense which encompasses the cases where the first of these two acids can contain, in the initial state, at least one other organic acid and/or the second of these two acids can contain at least one other inorganic acid, this or these other acid(s) being present, in this case, in low proportion;
- the parameter $X_o$ above includes various other constituents which are non-essential for carrying out the invention but which can optionally be added to the three base materials (cellulose, formic acid and phosphoric acid), for example in order to improve the impregnating of the plates or their kneading, or in order to modify or improve certain properties of the solutions obtained, or of the fibers spun from these solutions when these are spinnable solutions, these additional constituents preferably being unreactive, or only weakly reactive, with the three base materials.

The importance of the parameters $K_o$ and $R_o$ defined in relationships (1) and (2) above is known to those skilled in the art. The cellulose concentration ($K_o$) plays a major role as regards the spinnability properties of the final solution, its optical properties (anisotropy or isotropy) and the choice of many spinning parameters, for example for the production of fibers having given properties of linear density and mechanical properties. The weight ratio of the two acids ($R_o$) makes it especially possible to adjust the degree of formate-substitution of the cellulose considerably (see abovementioned patent EP-B-179,822), but also the viscosity of the solution, and thus its spinnability. This ratio therefore has an influence on the control of certain spinning parameters, such as the spinning temperature or the spinning draw factor, for example.

II-2. Starting Materials

Three base starting materials are cellulose plates, formic acid and phosphoric acid.

II-2.1. Cellulose Plates

The process in accordance with the invention is carried out starting directly with cellulose plates.

In accordance with the above description, the term "cellulose plates" is understood to refer to raw cellulose plates such as those which may be available industrially, but also any cellulose sheets having a coherent, fibrous core structure, and whose thickness and density have values equivalent to those of these raw plates.

These sheets can be of homogeneous or non-homogeneous density and thickness, solid, or have, in contrast, appreciable discontinuities of density. They can be, for example, plates obtained after pre-treatment or pre-working of the original raw plates, for example a surface treatment, punching, or a restructuring operation such as compression of the plates thus allowing their density to be increased.

The invention applies all the more so to pieces of the above plates or sheets. The term "plates" is thus also understood to refer generally to these size-reduced elements obtained, for example, by cutting, which have themselves not undergone, during their preparation, any appreciable core disintegration or destructuring action before being placed in contact with the impregnating liquid.

It may in fact be necessary for those skilled in the art, in certain cases, to cut up raw plates whose surface area is too large before or while the process is carried out, for example to convert continuous strips which are too wide into several smaller parallel strips, in order to make it easier for them to enter a hopper, or alternatively to transfer them continuously and automatically via the impregnating means and/or the kneading means.

Needless to say, the minimum size of these plates is not a critical parameter of the process. However, the process is preferably carried out with so-called "whole" plates, that is to say the plates having, in their plane, appreciably large sizes, namely:
- either a surface area, for each face, of greater than 100 cm$^2$, preferably greater than 500 cm$^2$, if these whole plates are in a cut, rectangular and flat form;
- or a length of more than 10 m, preferably more than 50 m, if these whole plates are in continuous strips or narrow strips rolled up on themselves, these continuous (narrow) strips having, in this case, a width preferably of more than 0.5 cm, more preferably of more than 2.5 cm.

In order to facilitate the impregnating and then kneading operations of these plates, and thus to reduce the times required to obtain the solutions, the process is preferably carried out starting with plates with a density of less than 1.1 g/cm$^3$, more preferably less than 0.9 g/cm$^3$, and with a thickness of less than 5 mm, more preferably less than 3 mm.

The lower limits of these two parameters are not critical for the process. However, for economic reasons, these plates advantageously have a thickness of more than 0.2 mm, preferably more than 0.4 mm, and a density of more than 0.2 g/cm$^3$.

All the density and thickness values indicated above are understood as being average values on the plates, it being possible for these plates to have more or less homogeneous densities and/or thicknesses.

Advantageously, the process is carried out with high-density plates (density at least equal to 0.5 g/cm$^3$), which are generally more homogeneous, more compact and industrially more appealing.

The plates used have an initial water content which is preferably less than 10% by weight, even more preferably less than 8% by weight.

II-2.2. Formic Acid and Phosphoric Acid

In a known manner (see abovementioned patent EP-B-179,822), the formic acid here is the esterification acid, and the phosphoric acid is the solvent for the system. The two acids are optionally used premixed in the impregnating liquid.

The process is carried out without being limited to the use of these two acids alone, taken in pure form.

Thus, for example, the formic acid can contain, in low proportions, other non-aromatic, monocarboxylic organic acids, for example acetic acid or butyric acid, anhydrides or mixed anhydrides of these acids, as well as halides of these acids, for example chlorides, it being possible for these acids, these anhydrides and these halides to contain substitution groups, for example halogen groups or alkyl groups.

The phosphoric acid can also contain, in low proportions, other inorganic acids such as sulfuric acid or hydrochloric acid, for example. In general, the phosphoric acid used is orthophosphoric acid ($H_3PO_4$), but other phosphoric acids or a mixture of phosphoric acids can be used. The phosphoric acid can, depending on the case, be used solid, in the liquid state or dissolved in the formic acid.

Preferably, the formic acid and the phosphoric acid each contain less than 10% by weight, even more preferably less than 5% by weight, of these other constituents.

The water content in these two acids is preferably less than 5% by weight, even more preferably less than 3% by weight. However, the absence of water in the acids, which is moreover not realistic from an industrial viewpoint on account of the recycling of these acids, is not desirable since a small amount of water appears to be a rather favorable factor for the dissolving of the cellulose. Preferably, the acids contain more than 1% by weight of water.

When the two acids are in contact with each other, their weight ratio is expressed in general, and without any particular different relationship indicated specifically, as follows:

R=(F/P), with:

F: parts by weight of formic acid, the formic acid being, in this case, either in the form of free formic acid or in the form of formate, as indicated above for $F_o$;

P: parts by weight of phosphoric acid.

II-3. Dissolving of the Plates

The cellulose plates are dissolved by means of a preimpregnating step, followed by a step of kneading of these plates, adjustment operations optionally being added to these steps in order to verify, at the end of the process, the abovementioned relationships (1) and (2).

II-3.1. Impregnating of the Plates a) General Comments

The preimpregnating step is generally carried out by simple contact with an impregnating liquid based on formic acid, that is to say without it being necessary to use external forces in order to make the liquid penetrate into the plates.

The impregnating liquid may or may not contain a certain proportion of phosphoric acid. Preferably, the impregnating liquid consists of more than 90% by weight of formic acid or of a mixture of these two acids.

This liquid can be used at room temperature or otherwise, for example at a temperature above room temperature, so as to lower, for example, its surface tension and thereby facilitate the impregnating of the plates.

This impregnating phase can be carried out using different known means. For example, the plates can be impregnated batchwise in a hopper. The process can also be carried out by continuous throughput in a bath containing the impregnating liquid, when the plates are rolled up, in the form of continuous (narrow) strips of appreciable length. Such (narrow) strips may be automatically joined end-to-end at the inlet to the impregnating means, in order to treat continuously even larger amounts of product. This step can also be carried out by spraying the impregnating liquid on to the moving plates.

The impregnating must be complete, that is to say that it must lead to total penetration of the impregnating liquid into the plate, down to the core, this signifying that the inter-fiber voids are then substantially filled with the impregnating liquid.

Needless to say, it is necessary to have a sufficient amount of impregnating liquid. The person skilled in the art will know how to adapt this amount after reading the description and the production examples which follow, taking into account especially the thickness and density of the plates used, the technical means employed, and the production durations intended for the solutions.

In particular, when the impregnating is carried out batchwise, for example on cut plates, in a hopper, it is preferred to use a weight excess of liquid relative to the solid (cellulose plates), that is to say to verify the following relationship:

(L/S)>1, with

L: parts by weight of liquid;

S: parts by weight of solid.

More preferably, when high-density plates are used, this gives:

$$(L/S)>2,$$

and even more preferably:

$$(L/S)>3.$$

The duration of the impregnating of the plates, before the kneading operation, is generally between a few seconds and 1.5 hours, preferably between a few seconds and 10 minutes, these durations varying depending on the specific production conditions.

The formic acid plays a major role in the implementation of the process of the invention. Experience shows, for example, that formic acid alone, placed in contact with cellulose plates, is absorbed very rapidly, almost instantaneously in most cases (a few seconds to 1 minute), diffusing and penetrating down to the core of these plates, impregnating them completely. Thus, a high-density plate with a thickness of 1 mm, for example, having the appearance of a thick, hard cardboard, can acquire the appearance of a blotting paper 2 to 3 mm in thickness, having the consistency of a wet pad of cotton wool, in less than 10 seconds.

It is thought that, by virtue of this specific action of formic acid, it will be possible to obtain complete and easy penetration of the phosphoric acid, and thereby to allow rapid dissolving as well as optimal formylation of the cellulose during the subsequent kneading, starting, in an entirely unexpected manner, directly from cellulose plates.

b) Impregnating Weight Ratio

In general, when the impregnating is carried out by simple contact, the higher the density of the plates, the more their impregnating appears to be facilitated by a high formic acid content in the impregnating liquid.

In particular, if phosphoric acid is present in the impregnating liquid, excess formic acid is generally used: this is understood to mean a weight ratio (formic acid/phosphoric acid) which is greater than the weight ratio $R_o$ chosen for the final solution.

The weight ratio of the two acids, in the impregnating liquid as finally chosen to carry out the invention, is conventionally abbreviated as $R_i$ and defined by the following relationship:

$Rk_i=(F_i/P_i)$, with:

$F_i$: parts by weight of formic acid;

$P_i$: parts by weight of phosphoric acid, $R_i$ being the so-called "impregnating weight ratio".

$R_i$ is thus the specific value of the weight ratio $R=(F/P)$, corresponding to the actual and effective implementation conditions of the invention.

The determination of an optimum value of $R_i$, in order to carry out the process of the invention, can be made experimentally, in a simple manner for those skilled in the art, by successive tests of impregnating and/or dissolving of the plates considered, either on an actual scale or, preferably, in laboratory devices of smaller size.

In general, as may be observed especially by means of such tests, the use of formic acid without phosphoric acid, or of an excess of formic acid ($R_i>R_o$) when a mixture of the two acids is used, facilitates and accelerates the impregnating of the plates, this being all the more true the higher the density of these plates. It is assumed that such conditions allow, on the one hand, faster diffusion of the impregnating liquid, and, on the other hand, limit the risks when too large an amount of phosphoric acid is present, of excessively rapid dissolving taking place at the surface of the plates, with possible formation of a kind of gel, which slows down or even blocks the penetration of the liquid down to the core.

In general, for high-density plates, the invention is thus carried out with an excess of formic acid, that is to say that the following relationship holds:

$R_i>R_o$.

Preferably, for high-density plates with a density substantially greater than 0.5 g/cm$^3$, for example about 0.7 g/cm$^3$ or more, the following relationship holds:

$(R_i/R_o) \geq 10$.

Such relationships can apply, all the more so, to low-density plates. However, their lower compactness makes them more readily accessible to reactants, and thus more readily impregnable. Experience shows, in fact, that the formic acid alone, or in excess in the case of a mixture, is generally not necessary for such plates. In particular, if the density of the plates is substantially less than 0.5 g/cm$^3$, for example about 0.4 g/cm$^3$ or less, it is then advantageously possible to use an impregnating liquid whose weight ratio $R_i$ is already adjusted to the predefined value $R_o$. In this case, the following relationship is applied:

$R_i=R_o$, and the subsequent adjustment operations are thus limited solely to the predefined value $K_o$ for the cellulose concentration.

The determination of an optimum value of $R_i$, in order to carry out the process, can also be made using simple impregnating tests of plate samples, taking into account the specific implementation conditions of the invention (for example thickness or density of the plates, composition or temperature of the liquid).

The choice of the ratio $R_i$, particularly in the case of high-density plates, can be made, for example, by subjecting the plates to the impregnating test described in paragraph I-5 of section I. Samples of these plates are subjected to a series of tests in which the weight ratio $R=F/P$ (formic acid/phosphoric acid) in the impregnating liquids tested is gradually decreased, while at the same time measuring the impregnating time for each of these liquids.

FIG. 2 represents, for example, the result of such a series of tests carried out on high-density plates (density=0.7 g/cm$^3$). The square root of the impregnating time ("t" expressed in seconds), on the y-axis, is plotted as a function of the weight ratio $R=(F/P)$, on the x-axis, along the curve C.

Starting, for example, with a ratio $R=9$, it is firstly observed that an increase in the phosphoric acid content (reduction of R) has little effect on the degree of impregnating (part C-1 of the curve). Next, a sudden change in slope is observed (part C-2 of the curve), with the time required for impregnating then rising very steeply for small reductions in the weight ratio R. The impregnating test thus reveals here the existence of a critical weight ratio, abbreviated as $R_c$ and equal to about 2, below which the impregnating liquid proves to be of markedly lower efficacy at impregnating the plates considered.

The above finding is in good agreement with the observations made in the course of plate dissolving experiments on an actual scale. As explained above, it is assumed that such a phenomenon is caused, when too large an amount of phosphoric acid is present, by an excessive dissolving action of the impregnating liquid, this action slowing down to a greater or lesser extent, or even blocking, the complete penetration of the said liquid down to the core, following the formation of a kind of gel at the surface, or to a certain depth in the plates.

Consequently, following the above impregnating test, the composition of the impregnating liquid is chosen so as to verify the following relationship:

$R_i>R_c$.

In the specific case in which the preferred range thus determined ($R_i>R_c$) contains the predefined value $R_o$ for the final solution (i.e. $R_o>R_c$), a liquid whose impregnating weight ratio $R_i$ is equal to $R_o$ is then advantageously used. This case can arise when low-density plates, which are easier to impregnate, are used.

In the general case in which this preferred range does not contain the value $R_o$, a value $R_i$ included in this preferred range is then used (for example $R_i$ equal to 3 in the case corresponding to FIG. 2).

It should be noted that it is not necessary to choose a value $R_i$ which is as close as possible to the value $R_c$, that is to say to choose an excess of formic acid which is as low as possible, taking into account the adjustment operation which will necessarily have to follow, during which operation the weight ratio of the two acids will finally be adjusted to the value $R_o$, in particular by addition of the required amount of phosphoric acid.

On reading this description and the production examples which follow (Section III), a person skilled in the art will thus know how to determine an optimum value for the impregnating weight ratio $R_i$, depending on the specific production conditions. In particular, in the final choice of the impregnating conditions, technological parameters not directly linked to the properties of the plate or of the impregnating liquid, for example the rate of supply of a spinning plant placed, in series, at the outlet of the kneading means should also be taken into account.

During the single impregnating step, for example with formic acid alone, the degree of substitution of the cellulose does not exceed values of about 12%, on account of non-homogeneous formylation on a cellulose which, although admittedly it is impregnated, is not dissolved (crystalline regions which are difficult to access). During the kneading step which follows, both optimal formylation of the cellulose and total dissolving of the plates will be able to be obtained.

II-3.2. Adjustment

After the preliminary impregnating step described in paragraph II-3.1. above, the cellulose concentration and the weight ratio of the two acids are adjusted, if this has not already been done, so as to verify, at the end of the process, the abovementioned relationships (1) and (2).

These two operations of adjustment to the values $K_o$ and $R_o$, carried out simultaneously or otherwise, can be carried out before and/or during the kneading if it involves adding constituents, and before and/or during and/or after the kneading if it involves removing constituents, on condition, however, that the kneading is carried out on plates which are in contact with both formic acid and phosphoric acid.

Two different cases must be considered, for these adjustment operations, depending on whether or not the impregnating liquid contains phosphoric acid.

a) Impregnating Liquid Free of Phosphoric Acid

In such a case, all of the phosphoric acid must be added and formic acid must be removed, if necessary, so as to verify the relationships (1) and (2) in the final solution.

By way of example, the process can be carried out as follows:

The plates, preimpregnated batchwise in a hopper, are then transferred to the kneading means equipped with a device for placing under vacuum, into which is incorporated the amount of phosphoric acid required for the final solution ($P_o$). The kneading operation is then started. If formic acid is then added in excess relative to the predefined amount $F_o$ for the final solution (i.e. $R>R_o$), which is generally the case if an appreciable excess of liquid has been used for the impregnating step (high value of the abovementioned ratio L/S), this excess can be removed, during and/or after the kneading, by simple evacuation under vacuum, by virtue of the relatively volatile nature of formic acid.

b) Impregnating Liquid with Phosphoric Acid General Case: Ri [sic] Different from Ro [sic]

As explained above, the impregnating was carried out in the general case, especially for high-density plates, with a liquid having an impregnating weight ratio $R_i$ greater than the predefined weight ratio $R_o$ for the final solution.

In this case, phosphoric acid must be added and/or formic acid removed, so as to verify the relationships (1) and (2) in the final solution.

By way of example, the process may be performed as follows: the plates, cut or in continuous strips, are placed in a hopper for impregnating. They are then transferred, for example emptied directly, into the kneading means equipped with a device for placing under vacuum. The missing amount of phosphoric acid is then added, before and/or during the kneading, and/or the excess amount of formic acid is removed, during and/or after the kneading, by evacuation under vacuum.

The process can also be performed as follows: a continuous plate, in the form of a strip, is preimpregnated by continuous throughput in a bath, and then drained, on leaving this bath, by forced passage between two press rollers whose separation, and thus the draining pressure, are preset. The amount of liquid expelled from the plate is thus adjusted so as to retain in the said plate, as regards the formic acid, only the portion necessary $F_o$ for a given amount $C_o$ of cellulose. Since the phosphoric acid is, in this case, always in deficit ($R>R_o$), it then remains to add the missing amount of this acid, during the transfer of the plates thus impregnated to the kneading means, or in these means themselves.

An alternative to the above case is to remove the excess impregnating liquid by draining, so as to retain in the plate, as regards the phosphoric acid, only the portion necessary $P_o$ for a given amount $C_o$ of cellulose. Since the formic acid is, in this case, always in excess in the plate ($R>R_o$), this excess is removed later, by evacuation under vacuum, during and/or after the kneading.

Specific Case: Ri [sic] Equal to Ro [sic]

As explained above, in the specific case of low-density plates having, in particular, a density substantially less than 0.5 g/cm$^3$, for example of about 0.4 g/cm$^3$ or less, or in the specific case in which the preferred range determined by the impregnating test contains the predefined value $R_o$ (i.e. $R_o>R_c$), it is advantageously possible, in this case, to use an impregnating liquid such that the ratio $R_i$ is already adjusted to this value $R_o$.

The adjustment operation is then limited to the predefined value for the cellulose concentration ($K_o$). This adjustment is made by simply removing the impregnating liquid or even, if it was necessary, by adding such a liquid.

By way of example, the process may be performed as follows:

A continuous plate, in the form of a strip, is preimpregnated by continuous throughput in a bath, and is then drained at the outlet of this bath by a passage between two press rollers, as described above. Only the amount of liquid required for a given amount ($C_o$) of cellulose is thus retained.

This adjustment of the cellulose concentration to the value $K_o$ may, moreover, not be necessary in the specific case in which it has been possible to carry out the process with amounts of cellulose and of impregnating liquid that are adjusted from the start, for example by pouring, directly into a hopper, the amount of liquid required on to the corresponding amount $C_o$ of cellulose.

After reading the description and the production examples which follow, a person skilled in the art will know how to define the appropriate moment for these adjustment operations, depending on the specific production conditions, especially taking into account the composition of the impregnating liquid (presence or absence of phosphoric acid), the density of the plates and the technical means of impregnating or kneading used.

II-3.3. Kneading and Production of the Solutions

Transfer of the plates from the impregnating means into the kneading means, if these means differ, is carried out by any known means which is suitable for the specific production conditions of the invention, for example by emptying the plates directly into a hopper in a mixer placed below it, using a conveyer belt, simply putting the plates through when they are in the form of continuous strips.

Entry into the kneading means can take place directly, or via a feed screw, for example. During this transfer to the kneading means, the form of the plates can be adapted, if necessary, in order to facilitate their entry into the said means, for example by folding them up, or alternatively by cutting continuous strips which are too large into narrower strips. It may also be envisaged to place these continuous strips one on top of another, at the outlet of the impregnating means, in order to increase the flow rate through the kneading means.

The kneading is carried out on plates which are in contact with both formic acid and phosphoric acid, the presence of phosphoric acid being necessary from the start of the kneading, on account of its lubricant action which facilitates the preparation of the mixture.

The appropriate kneading means are known to those skilled in the art. They must be capable of correctly kneading and pugging, preferably at a controllable speed, the cellulose plate impregnated with its liquid, until the solution is obtained. The kneading can be carried out, for example, in a mixer containing Z-shaped arms or in a mixer with a continuous screw. These kneading means can, depending on the needs, be equipped with a device for evacuation under vacuum and/or with a heating and cooling device which makes it possible to adjust the temperature of the mixer and its contents, in order to accelerate, for example, the kneading operations themselves, to control the temperature of the solution during formation and to facilitate the evacuation under vacuum of the formic acid.

Preferably, the duration of the kneading is between 15 minutes and 1.5 hours.

The solutions in accordance with the invention can be prepared as described above, without any other transformation on the cellulose plates apart from the impregnating and kneading operations, to which plates the adjustment phases are conveniently added when they are required, especially in the case of ready-for-spinning solutions.

Moreover, the production times for these solutions are particularly short when compared with those of known processes carried out starting with plates for the production of spinnable solutions of cellulose derivatives, such as the viscose process, for example.

The process in accordance with the invention preferably verifies the following relationship:

$$T_{sol} < 3,$$

$T_{sol}$ being the time to dissolve the plates (expressed in hours), i.e. the total time taken to carry out the process in accordance with the invention.

More preferably, the following holds: $T_{sol} < 1$.

Even more preferably, the following holds: $T_{sol} < 0.5$.

II-4. Use of the Solutions

The solutions obtained can be used to obtain various finished objects or articles made of cellulose formate or of cellulose regenerated from this formate.

By way of example, the solutions obtained can be extruded outside the mixer, through a plate pierced with holes, in order to obtain liquid rods of large diameter (for example of about one millimeter) which are then immersed in water for coagulation and neutral washing, after which they are dried with hot air. Solid rods of cellulose formate are thus obtained.

Thinner rods (diameter of about one-tenth of a millimeter, for example), or even coarse fibers in the form of cellulose formate flock, can also be obtained by this technique.

It can also be envisaged to give the solutions specific shapes, for example by casting or pressing techniques, and then to coagulate, wash and dry them so as to obtain objects made of cellulose formate, for example cellulose formate plates.

It is also possible to produce thin films, for example by extruding the solution on cylinders of a calender.

The solutions obtained are preferably ready-for-spinning solutions, i.e. solutions which can be transferred directly, for example by means of an extruder screw placed at the mixer outlet, to a spinning machine in order to be spun therein, without any other prior transformation other than usual operations such as degassing or filtration, for example.

These solutions can then be spun according to known techniques, such as "wet" spinning methods (die immersed in the coagulation bath) or "dry-jet-wet" spinning methods (use of a non-coagulant layer).

When the solutions in accordance with the invention are ready-for-spinning solutions, which can be spun in particular according to the dry-jet-wet technique, they preferably have at least one of the following characteristics:

their cellulose concentration is between 10% and 35%, more preferably between 15% and 25% (% by weight);

their total formic acid concentration is between 5% and 50%, more preferably between 15% and 25% (% by weight);

their phosphoric acid concentration is between 85% and 15%, more preferably between 70% and 50% (% by weight);

the degree of substitution of the cellulose is greater than 20%, more preferably between 25% and 50%, even more preferably between 30% and 45%;

they are optically anisotropic.

III. EXAMPLES OF IMPLEMENTATION OF THE INVENTION

The tests described below can either be tests in accordance with the invention or tests not in accordance with the invention.

III-1. Test A

This example describes a test in accordance with the invention, in which high-density plates are used. The impregnating is carried out batchwise in a hopper, with formic acid alone, i.e. without phosphoric acid III-1.1. Aim of the Test and Initial Conditions In this test, it is desired to prepare a ready-for-spinning cellulose formate solution containing 16% by weight of cellulose (based on a non-esterified cellulose) and 84% by weight of acids (formic acid plus phosphoric acid), and also characterized by a high DS. As explained above, the term "formic acid" is understood to refer to the total formic acid present in the solution, either in the form of formate or in the form of free formic acid.

It is moreover desired that the acids, in the final solution, be distributed in a weight ratio (formic acid/phosphoric acid) close to 0.30. The reason for this is that it is known (see abovementioned patent EP-B-179,822—tests 7 to 10 of Table 4, for example) that for such a cellulose concentration, such a weight ratio of the two acids can lead to high DS values (all higher than 30% in these tests 7 to 10).

This knowledge of the prior art thus makes it possible to quantify the predefined adjustment values $K_o$ and $R_o$ of the abovementioned relationships (1) and (2), namely, for this test:

$$K_o = 0.16; \quad R_o = 0.30.$$

180 g of whole, rectangular plates are used, prepared by cutting up raw plates. These plates were cut up so as to facilitate their entry into kneading means of a size suitable for laboratory tests. In the case of industrial-scale devices, continuous raw plates could be unwound therein, without any prior cutting operation.

These whole plates have the following characteristics:
density: 0.7 g/cm$^3$;
thickness: 1 mm;
minimum surface area (for each face): 600 cm$^2$
DP of the cellulose: 600;
water content: 6.5%.

The composition targeted for the final solution is thus predefined as follows:
cellulose ($C_o$): 180 g (16%);
formic acid ($F_o$): 220 g (19%);
phosphoric acid ($P_o$): 730 g (65%);
other constituents ($X_o$): none.

III-1.2. Production of the Solution and Spinning

The process is performed as follows in order to obtain the solution:

650 g of formic acid (containing 2% by weight of water) are first poured on to the 180 g ($C_o$) of cellulose placed beforehand in a hopper, the weight ratio L/S (liquid/solid) thus being equal to 3.6;

It is then observed that the formic acid is absorbed in a few seconds by the cellulose, and gradual swelling of the plates is observed. The plates are thus left to become impregnated in the hopper, by simple contact, without stirring, for a few tens of seconds (less than one minute);

These plates thus impregnated are then poured into a 2-liter mixer containing Z-shaped kneading arms and equipped with a device for evacuation under vacuum (LKIII2 mixer from the company Linden);

The 730 g ($P_o$) of solid orthophosphoric acid (containing 2% by weight of water) in the form of flakes are then introduced into this mixer. This mixture is kneaded for 5 minutes;

At this point, the weight ratio R (formic acid/phosphoric acid) is equal to about 0.89 and is thus markedly higher than the predefined value $R_o$ (0.30) for the final solution. The cellulose concentration is, itself, markedly lower than the predefined value $K_o$;

Kneading is further carried out for 20 minutes, while evacuating the excess formic acid from the mixer using a vacuum pump (vacuum of about 10 mbar). This formic acid is recovered in liquid form, while being weighed. The pump is switched off when the 430 g of excess formic acid are recovered, this amount of formic acid being retained for another dissolving operation. This then leaves 220 g ($F_o$) of formic acid in the solution, and the final composition of the solution has thus been adjusted to the predefined values $K_o$ and $R_o$;

The kneading is carried out at room temperature at the start, and the mixer includes no heating or cooling device. The final temperature of the solution is about 35° C. The kneading speed used is about 35 rev/min.

1130 g of an anisotropic solution of cellulose formate whose DS is equal to 40% and whose DP is equal to 430 is thus obtained, in less than 30 minutes. Its water content is equal to about 4.5%.

The following relationship is thus verified:

$$T_{sol}<0.5.$$

This solution is used to spin a cellulose formate fiber, according to the so-called "non-coagulant layer" (dry-jet-wet) technique. This fiber can then be regenerated in order to obtain a regenerated cellulose fiber. These known techniques are, for example, as described in above-mentioned patent EP-B-179,822.

A regenerated cellulose fiber is thus obtained (DS<1%), consisting of 500 elementary filaments, whose linear density is 92 tex and whose mechanical properties are as follows: tenacity: 65 cN/tex; elongation at break: 4.6%; initial modulus: 2650 cN/tex.

III-2. Test B

This example describes a test not in accordance with the invention, and it is given for the purposes of comparison with Test A above.

A cellulose formate solution is prepared in a known manner, that is to say by first carrying out grinding of the same cellulose plates as those used in Test A above, in order to obtain a powder. 180 g of this powder, 220 g of formic acid and 730 g of phosphoric acid are then introduced into the same mixer as for Test A.

After kneading for 30 minutes, an anisotropic solution is obtained whose DS (40%) and DP (440) are virtually identical to those of the solution obtained in Test A above, and of the same water content as that of the above solution.

This solution is spun in accordance with Test A. The fiber obtained after regeneration (DS<1%) has a linear density of 92 tex (for 500 elementary filaments) and the following mechanical properties: tenacity: 65 cN/tex; elongation at break: 4.5%; initial modulus: 2650 cN/tex.

The properties of the fibers of Example A and of Example B are thus entirely similar.

III-3. Test C

This example describes a test in accordance with the invention, in which a high-density plate in the form of a continuous strip is used. The impregnating is carried out with a mixture of formic acid and phosphoric acid. The impregnating, adjustment and kneading steps are all carried out continuously.

III-3.1. Aim of the Test and Initial Conditions

In this test, it is desired to prepare a ready-for-spinning cellulose formate solution containing 22% by weight of cellulose and 78% by weight of acids (formic acid+phosphoric acid) and characterized by a high DS. For this, a weight ratio (formic acid/phosphoric acid) equal to about 0.30 is targeted for the final solution.

The predefined adjustment values $K_o$ and $R_o$, in the relationships (1) and (2), are thus as follows:

$$K_o 0.22; R_o=0.30.$$

A whole plate in the form of a continuous strip, as delivered industrially, i.e. rolled up, is used in this test. This plate has the following characteristics:
density: 0.7 g/cm$^3$;
thickness: 0.9 mm;
width: 178 mm;
weight: 30 kg;
length: 280 m;
DP of the cellulose: 560;
water content: 5%.

The composition intended for the final solution is thus as follows, for example for 220 g of cellulose corresponding to an initial plate length of about 1.10 m:
cellulose ($C_o$): 220 g (22%);
formic acid ($F_o$): 180 g (18%);
phosphoric acid ($P_o$): 600 g (60%);
other constituents ($X_o$): none.

For the choice of the impregnating weight ratio $R_i$, samples of this plate are subjected beforehand to the impregnating test described in paragraph I-5. This test is carried out using 5 mixtures of formic acid and of phosphoric acid, of decreasing formic acid content, so as to vary the weight ratio F/P (formic acid/phosphoric acid) in the range from about 9 to 1. For each mixture, the impregnating time (abbreviated as "t") is measured and the square root of the time "t" is plotted as a function of the weight ratio (F/P) of the two acids. The curve C as represented in FIG. 2 is thus obtained.

As explained above, the optimum impregnating conditions correspond to part C-1 of the curve (R>$R_c$). Since the value $R_c$ (about 2) is appreciably higher than the predefined value $R_o$ (0.3), the following relationship for the choice of the impregnating liquid is thus applied, in accordance with the above explanations:

$R_i$>$R_c$.

In the present case, $R_i$ is chosen equal to 3, the ratio ($R_i$/$R_o$) then being equal to 10.

The impregnating liquid chosen thus contains 75% formic acid and 25% phosphoric acid. These two acids contain from 2 to 2.5% by weight of water.

III-3.2. Production of the Solution

The process is performed as follows in order to obtain the solution:

The plate is unwound and then impregnated by simple contact, by continuous throughput in a bath containing the predefined mixture of formic acid and phosphoric acid ($R_i$=3);

On leaving the bath, the plate thus impregnated is drained between two press rollers whose separation, and thus whose draining pressure, have been preadjusted. The amount of liquid expelled from the plate is thus adjusted so as to retain in this plate, as regards the formic acid, only the portion required $F_o$ (i.e. 180 g) for the corresponding amount of cellulose (i.e. $C_o$=220 g)

The time elapsed between placing the plate in the bath and its arrival between the two press rollers is equal to about 5 minutes;

On leaving the rollers, about 240 g of impregnating liquid then remain for 220 g of cellulose, these 240 g of liquid containing only 60 g of phosphoric acid out of the 600 g ($P_o$) required;

The plate thus impregnated is then transferred (transfer time less than 5 minutes), by simple throughput, to the inlet of a continuous-screw mixer (Conti DTB-6 mixer from the company List), into which the missing amount of phosphoric acid is introduced, by continuously measuring out 540 g of liquid phosphoric acid (at a temperature of about 55° C.) for 220 g of cellulose. The proportions of cellulose, of formic acid and of phosphoric acid are thus all adjusted to the values required for the final solution, before the kneading operation;

This mixture is kneaded for 45 minutes, inside the mixer, with a kneading speed of 24 rev/min. The mixer, with a capacity of 16 liters, includes devices for controlling the temperature at its inlet (50° C. for this example) and at its outlet (13° C. for this example).

A ready-for-spinning, anisotropic solution of cellulose formate whose DS is equal to about 30%, whose DP is equal to about 400 and whose water content is equal to about 6% by weight (calculated based on the total weight of solution) is thus obtained, in less than one hour).

The following relationship is thus verified:

$T_{sol}$<1.

This solution can be extruded from the mixer, transferred continuously, after degassing and filtration, to a spinning machine in order therein to be spun, in a known manner, as indicated, for example, for Test A above, or in abovementioned patent EP-B-179,822.

In this example, the impregnating conditions (speed of passage of the plates, impregnating time) have been adapted to the specific technological parameters of the test, in particular to the conditions of continuous transfer of the plates, between the impregnating means and the kneading means. Thus, in this Test C, the impregnating time of the plates, before kneading, is markedly greater than the impregnating time actually required in order to prepare a solution, i.e. between about ten seconds and a few tens of seconds approximately for the plates and the impregnating liquid considered here.

III-4. Test D

This example describes a test in accordance with the invention, in which a low-density plate in the form of a continuous strip is used. The impregnating is carried out with a mixture of formic acid and phosphoric acid whose impregnating weight ratio $R_i$ is adjusted, from the start, to the value $R_o$.

The impregnating, adjustment and kneading steps are all carried out continuously, as for Test C above.

III-4.1. Aim of the Test and Initial Conditions

The aim and the initial conditions are the same as for those of Test C above, except for the following differences or specific conditions:

the plate has a density of 0.4 g/cm$^3$ and a thickness of 0.6 mm;

the cellulose has an initial DP of 565;

the 220 g of cellulose plate, taken as the basis for calculation, correspond to an initial plate length of about 5.9 meters;

since the plate is a low-density plate with, in addition, a density substantially less than 0.5 g/cm$^3$, an impregnating liquid having a value $R_i$ equal to $R_o$ (i.e. $R_i$=0.30) is chosen here, thereby avoiding a subsequent adjustment operation.

The mixture used thus contains 23% formic acid and 77% phosphoric acid, the two acids having an initial water content of about 2 to 2.5% by weight.

III-4.2. Production of the Solution

The process is performed as follows in order to obtain the solution:

The plate is unwound and then impregnated by simple contact, by continuous throughput in a bath containing the predefined mixture of formic acid and phosphoric acid ($R_i$=$R_o$=0.30);

On leaving the bath, the plate thus impregnated is drained between two press rollers, as in Test C above. The amount of liquid expelled from the plate is thus adjusted so as to retain in the said plate only the amount of liquid required (i.e. $F_o$+$P_o$=780 g) for the given amount of cellulose (i.e. $C_o$=220 g);

The time elapsed between placing the plate in the bath and its arrival between the two press rollers is about 1 minute;

On leaving the press rollers, about 780 g of impregnating liquid then remain for 220 g of cellulose, and no subsequent adjustment operation is necessary;

On leaving the rollers, the plate thus impregnated is transferred automatically to the mixer, as described in Test C above, the transfer time being less than 5 minutes. The mixture is kneaded for 45 minutes at a speed of 24 rev/min;

The mixer temperature is 40° C. at its inlet and 13° C. at its outlet.

A ready-for-spinning anisotropic solution of cellulose formate whose DS is equal to about 30%, whose DP is equal to 395 and whose water content is equal to about 6% is thus obtained, in less than one hour.

The following relationship is thus verified: $T_{sol}<1$.

This solution is extruded from the mixer, and it can then be spun, in a known manner, as indicated above.

As in Example C above, the impregnating time was adapted to the specific technological conditions for carrying out the test, an impregnating time of only 10 seconds being sufficient, for the plates considered, to prepare a solution in accordance with the invention.

In general, the fibers obtained after spinning the solutions of the invention, spinning them in accordance with patent EP-B-179,822, have mechanical properties similar to those obtained by spinning solutions prepared from cellulose powder. This demonstrates in particular that the solutions in accordance with the invention and those prepared from powder have equivalent spinnability characteristics.

In conclusion, the process in accordance with the invention makes it possible to prepare a cellulose formate solution simply and advantageously in economic terms.

Such a process was entirely unexpected for those skilled in the art, since all the known methods for obtaining solutions of cellulose derivatives, starting from cellulose plates, involve either prior reduction to powder or prior mechanical disintegration of these plates.

The process of the invention has many advantages and mention will be made, in particular, of the following:

- It makes it possible to use any type of cellulose plates, whole cellulose plates, continuous or non-continuous, in particular raw plates such as those available industrially, and in particular high-density plates, which are industrially more appealing;
- It requires no prior step of disintegration or destructuring of the plates, such as a reduction to powder or shredding, thereby avoiding all of the known drawbacks of such methods, in particular the explosion and fire risks, and the risks of chemical deactivation of the cellulose;
- It is quick and easy to carry out, the cellulose plates moreover undergoing only a limited number of operations;
- It requires the use of only two base agents, the first (formic acid) acting both as impregnating agent and as esterification agent for the cellulose, and the second (phosphoric acid) acting both as solvent for the system and as lubricant for the kneading;
- It makes it possible, by virtue of adjustment operations during its implementation, to obtain ready-for-spinning solutions, these solutions moreover being obtained in very short times;
- It can be carried out continuously with the spinning operations, in particular when the plates used are continuous (narrow) strips;
- Lastly, it has the advantage of being non-polluting under the conditions of use described.

Needless to say, the invention is not limited to the examples described above.

Thus, for example, the plate impregnating step can be carried out other than by simple contact with the impregnating liquid, the invention applying to the case in which forced penetration of the impregnating liquid into the plates is brought about by means of external forces, for example by injecting the said liquid, by using centrifugation techniques or alternatively by drawing this liquid by suction across the plates by means of vacuum-pumping techniques. In the case of the use of such external forces, and if the impregnating liquid contains phosphoric acid, the impregnating weight ratio $R_i$ is then preferably chosen to be equal to the predefined ratio $R_o$ for the final solution.

Thus, moreover, other constituents can optionally be added to the three base materials, namely cellulose, formic acid and phosphoric acid, these constituents then being used in a minor proportion, the total of their parts by weight in the final solution, abbreviated as $X_o$, preferably being less than 10%, even more preferably less than 5% (percentage by weight of the solution).

The term "cellulose plates" especially covers cases in which these additional constituents are already present in the initial plates.

These additional constituents, which are preferably unreactive or only slightly reactive with the three base materials, can be, for example, salts, solvents such as alcohols (for example methanol), ketones (for example acetone), plasticizers, dyes or polymers other than cellulose which are optionally capable of being esterified during the preparation of the solution.

They may be, for example, various fillers or other additives which make it possible, for example, to improve or accelerate the impregnating and/or kneading of the plates, by lowering, for example, the surface tension of the liquids used, or which make it possible to improve the spinnability of the solutions obtained and/or the properties of the fibers spun from these solutions, for example their mechanical properties, their endurance properties or their adhesion to a rubber matrix.

Moreover, the term "cellulose formate" used in this document covers the cases in which the hydroxyl groups of the cellulose are substituted with groups other than formate groups, in addition to the latter groups, for example ester groups, especially acetate groups, the degree of substitution of the cellulose with these other groups preferably being less than 10%.

We claim:

1. Process for directly preparing a solution of cellulose formate by reaction of cellulose with formic acid and phosphoric acid, characterized by the following points:
   a) cellulose plates are used;
   b) the said plates are first fully impregnated with an impregnating liquid based on formic acid;
   c) after this preliminary impregnating, the plates are kneaded in contact with both formic acid and phosphoric acid.

2. Process according to claim 1, characterized in that the plates are whole plates.

3. Process according to claim 1, characterized in that the plates have a thickness between 0.2 mm and 5 mm.

4. Process according to claim 1, characterized in that the plates have a density of between 0.2 and 1.1 g/cm$^3$.

5. Process according to claim 1, characterized in that it is carried out in order to verify, at the end of the process, the following two relationships in the final solution:

$$K_o = C_o/(C_o + F_o + P_o X_o); \quad (1)$$

$$R_o = (F_o/P_o), \quad (2)$$

with:

- $C_o$: parts by weight of cellulose, based on a non-esterified cellulose;

$F_o$: total parts by weight of formic acid, this formic acid being either in the form of formate or in the form of free formic acid;

$P_o$: parts by weight of phosphoric acid;

$X_o$: parts by weight of other optional constituents;

$K_o$: predefined adjustment value for the cellulose concentration;

$R_o$: predefined adjustment value for the weight ratio of the formic and phosphoric acids.

6. Process according to claim 5, characterized by the following points:

d) the impregnating liquid contains no phosphoric acid;

e) after the preliminary impregnating, phosphoric acid is added and formic acid is removed, if necessary, in order to verify, at the end of the process, the relationships (1) and (2) in the final solution.

7. Process according to claim 5, characterized by the following points:

d) the impregnating liquid contains phosphoric acid, the weight ratio of the formic and phosphoric acids, in the said liquid, being defined as follows:

$$R_i = (F_i/P_i),$$

with:

$F_i$: parts by weight of formic acid;

$P_i$: parts by weight of phosphoric acid, $R_i$ being the so-called impregnating weight ratio;

e) after the preliminary impregnating, phosphoric acid is added and/or formic acid is removed, so as to verify, at the end of the process, the relationships (1) and (2) in the final solution.

8. Process according to claim 4, characterized in that the plates have a density at least equal to 0.5 g/cm$^3$.

9. Process according to claim 8, characterized in that the following relationship holds:

$$R_i > R_o.$$

10. Process according to claim 4, characterized in that the plates have a density of less than 0.5 g/cm$^3$.

11. Process according to claim 10, characterized in that the following relationship holds:

$$R_i = R_o.$$

12. Process according to claim 1, characterized in that the following relationship is verified:

$$T_{sol} < 3,$$

$T_{sol}$ being the time to dissolve the plates, expressed in hours.

13. Process according to claim 12, characterized in that the following relationship is verified:

$$T_{sol} < 1.$$

14. Process according to claim 13, characterized in that the following relationship is verified:

$$T_{sol} < 0.5.$$

15. Process according to claim 1, characterized in that the plates are impregnated by continuous throughput in the impregnating liquid.

16. Process according to claim 1, characterized in that the plates are impregnated batchwise.

17. Process according to claim 1, characterized in that, in the initial state, the cellulose plate has a water content of less than 10% by weight, and the formic acid and phosphoric acid each have a water content of greater than 1% and less than 5% (% by weight).

18. Process according to claim 5, characterized in that it is carried out in order to obtain a ready-for-spinning solution.

19. Process according to claim 1, characterized in that the impregnating step of the cellulose plates is carried out by simple contact of the plates with the impregnating liquid.

20. Process according to claim 1, characterized in that the impregnating step of the cellulose plates is carried out by forced penetration of the impregnating liquid by means of external forces.

21. Solution obtained according to a process in accordance with claim 1.

22. Solution according to claim 21, characterized in that it is optically anisotropic.

23. Solution according to claim 21, characterized in that it contains less than 10% by weight of water.

24. Object made of cellulose format or of regenerated cellulose, obtained from a solution in accordance with claim 21.

25. Object according to claim 24, characterized in that it is a fiber or a film.

26. Reinforcing assembly including at least one fiber and/or a film according to claim 25.

27. An article reinforced with at least one fiber and/or a film according to claim 25.

28. An article reinforced with at least one assembly according to claim 26.

29. An article reinforced according to claim 27 characterized in that it is a tire tread.

30. An article reinforced according to claim 28, characterized in that it is a tire tread.

* * * * *

UNITED STATES PATENT AND TRADEMARK OFFICE
CERTIFICATE OF CORRECTION

PATENT NO.   : 6,022,614
DATED        : February 8, 2000
INVENTOR(S)  : Aubry et al.

It is certified that error appears in the above-identified patent and that said Letters Patent is hereby corrected as shown below:

Title page,
Item [73], Assignee, "Cedex, France" should read -- Granges-Paccot, Switzerland --

Column 22,
Line 60, "$P_o X_o$" should read -- $P_o + X_o$ --

Column 2,
Line 34, "alkalicellulose" should read -- alkali-cellulose --

Column 3,
Line 44, "DRAWING" should read -- DRAWINGS --
Line 45, "drawing." should read -- drawings. --

Column 4,
Line 9, "[sic]" should be deleted

Column 7,
Line 10, "tm" should be deleted; and "(1)" should be moved to the right margin above "(2)"

Column 13,
Line 51, "Ri[sic]" should read -- $R_i$ --; and "Ro[sic]" should read -- $R_o$ --

UNITED STATES PATENT AND TRADEMARK OFFICE
CERTIFICATE OF CORRECTION

PATENT NO. : 6,022,614
DATED : February 8, 2000
INVENTOR(S) : Aubry et al.

It is certified that error appears in the above-identified patent and that said Letters Patent is hereby corrected as shown below:

Column 14,
Line 20, "Ri[sic]" should read -- $R_i$ --; and "Ro[sic]" should read -- $R_o$ --
Line 23, "0.4" should read -- 0.4 --

Signed and Sealed this

Twenty-second Day of January, 2002

JAMES E. ROGAN
*Director of the United States Patent and Trademark Office*

*Attest:*

*Attesting Officer*